United States Patent Office 3,159,572
Patented Dec. 1, 1964

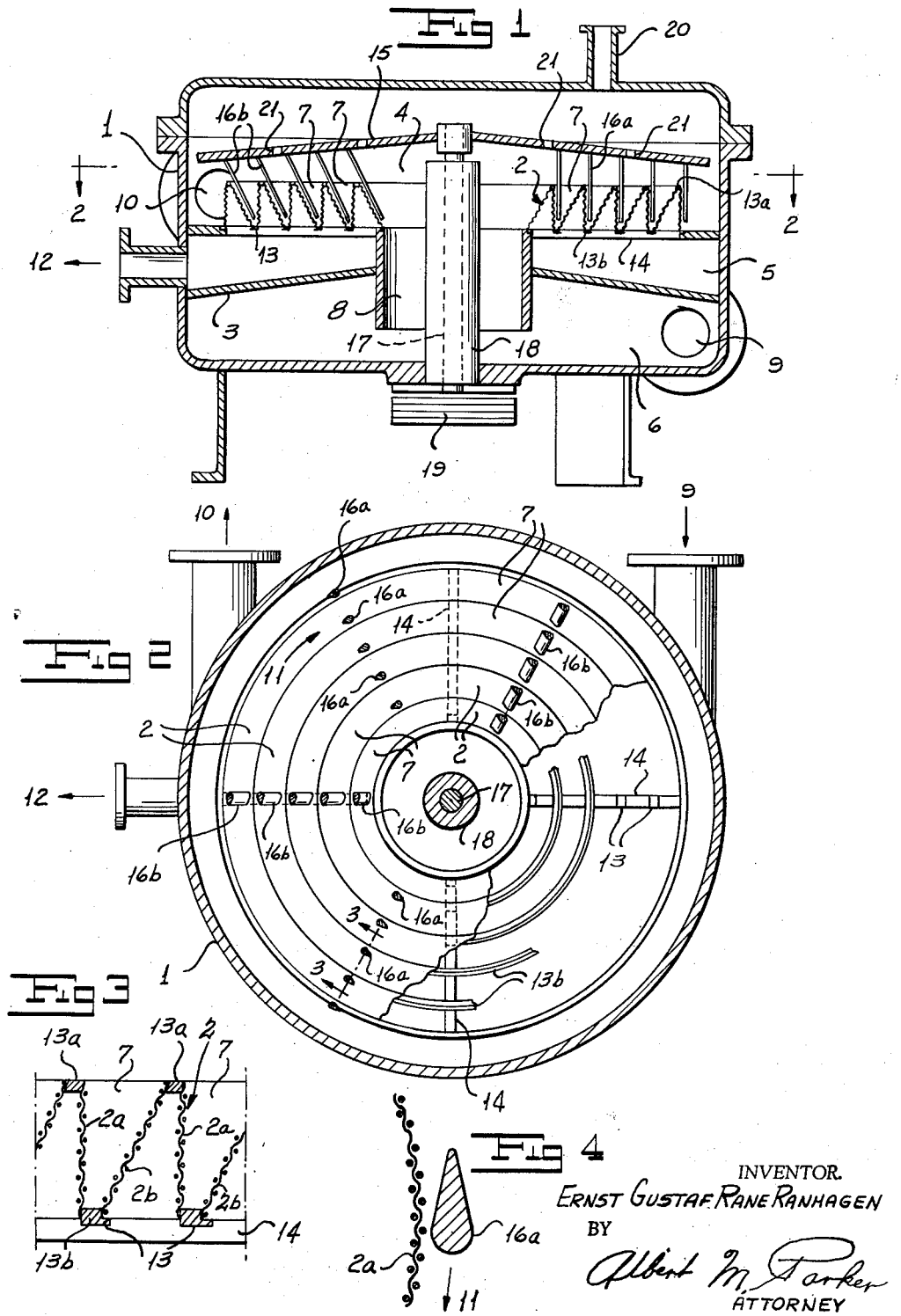

3,159,572
MEANS FOR THE STRAINING, FRACTIONATION AND CONCENTRATION OF SOLIDS, E.G., CELLULOSE FIBRES, SUSPENDED IN A LIQUID
Ernst Gustaf Rane Ranhagen, Vasterviksvagen 3, Danderyd, Sweden
Filed May 23, 1962, Ser. No. 197,019
Claims priority, application Sweden May 24, 1961
1 Claim. (Cl. 209—273)

The present invention refers to means for the straining, fractionation and concentration of solids, e.g., cellulose fibres, suspended in a liquid, said means comprising a substantially horizontal straining bottom provided with a concentric fold formation, said formation forming on its top side concentric annular grooves (straining grooves), the side walls of said grooves in a cross section thereof diverging upwards from the bottom of the grooves, the radially outer side wall of each straining groove extending in a radially outward direction; a suspension inlet to a chamber (straining chamber) above said straining bottom, said inlet being positioned centrally in relation to said straining grooves; a discharge opening from said chamber, radially arranged outside the straining grooves; and a stirrer or agitator arranged centrally to said grooves and mounted for rotation around a substantially vertical axis and positioned in said chamber, said stirrer having pins or fingers extending into said straining grooves.

The invention will be described in greater detail with reference to the accompanying drawing which diagrammatically and as an example illustrates an embodiment of the means according to the invention. In the drawing:

FIG. 1 illustrates a sectional side view of the means;
FIG. 2 illustrates a sectional view along the line 2—2 in FIG. 1 of the same means, a portion of the straining bottom and portions of the lower annular parts of the straining bottom being broken away for clarity of illustration;
FIG. 3 illustrates a section along the line 3—3 in FIG. 2 of the device, on a larger scale; and
FIG. 4 illustrates a detail, also on a larger scale.

Identical details are referred to with the same reference numerals in the different drawings.

The straining means according to FIG. 1 comprises a housing 1 having a circular cross section, said housing being divided by a straining bottom 2 and an intermediate bottom 3 into three chambers positioned above each other viz. a straining chamber 4, an intermediate chamber 5 and a bottom chamber 6.

According to the invention, the straining bottom has concentric folds providing concentric grooves 7 on its upper side. The bottom chamber is connected to the straining chamber by means of a duct 8, centrally positioned in relation to the grooves. The bottom chamber is provided with a tangential suspension inlet 9. The straining chamber is provided with a tangential discharge opening 10. Thus, suspension supplied through the inlet 9 enters the bottom chamber 6 where a vortex is formed, as indicated by the arrow 11 in FIG. 2 and then flows through the duct 8 where the whirling motion increases into the straining chamber 4. In the straining chamber this vortex will spread radially outwards across the straining bottom, while part of the suspension passes through the straining bottom, the remaining part of the suspension will be discharged through the discharge opening 10, that is in the direction of the flow of the vortex. Said part of the suspension passing through the strainer is collected in the intermediate chamber 5 and drained off through a discharge opening 12. In the case of a straining operation, therefore, the part of the suspension discharged through the discharge opening 10 will form the reject, while the part drained off through the discharge opening 12 will form the accept. In dewatering and thickening the process is reversed, i.e., the accept will come through the discharge opening 10 and the reject through the discharge opening 12.

According to FIG. 3 illustrating a cross section along the line 3—3 in FIG. 2 the straining bottom comprises cylindrical straining wall parts 2a and cone-shaped straining wall parts 2b joined by means of upper annular parts 13a and lower annular parts 13b. The straining bottom 2 is supported on a number (four shown) of fixed spokes 14, the upper surfaces of such spokes being provided with notches 13 within which the lower annular parts 13b fit, as shown more particularly in FIGS. 2 and 3.

A stirrer comprising a disc 15 with fingers or pins, shown in the form of vertical fingers 16a and inclined fingers 16b, extending into the straining grooves 7 is rotatably mounted in the straining chamber 4 on a driving shaft 17 centrally positioned in relation to the grooves, said shaft being mounted in a bearing 18 provided with a pulley 19 for connection to a driving motor (not shown). By means of this arrangement, the fingers or pins may be rotated in the direction of flow of the said vortex in the grooves in the direction of the arrow 11 by rotation of the disc. The fingers 16a will then sweep the outer sides of the side walls 2a, and the fingers 16b the inner sides of the side walls 2b.

FIG. 4 illustrates a cross section of a finger 16a sweeping part of a straining wall 2a. The finger has a known cross sectional shape causing alternatively a pressure and suction effect along the straining wall, thereby preventing formation of a filter cake. Each straining wall 2a and 2b is swept by three such fingers or pins evenly distributed along the circumference, and causing each part of a straining wall to be subjected to three such pressure variations or oscillations per revolution of the stirrer. A suitable speed of for instance about 400 r.p.m. will give 1200 vibrations per minute.

Apart from this known oscillating effect, the fingers of said device have the effect of causing the suspension to rotate in the straining chamber with or without the additional effect of causing a vortex to be formed in the device, said rotation causing strong centrifugal forces to act in the radial flow direction across the straining bottom. This will cause comparatively large and heavy particles in the suspension to be removed quickly from the device without entering the grooves while other particles partly entering said grooves but not passing through the strainer will be separated and removed over the bevelled strainer walls 2b. It should be noted that such particles have a tangential as well as a radial kinematic force component in relation to the grooves, their paths of direction when discharged from the grooves therefore being much less steep than the inclined straining wall itself. Due to this fact the distance between said grooves may be small without reducing the separation effect. This fact provides for a relatively large straining surface for a given diameter of the bottom, even with comparatively shallow grooves. This is in accordance with one of the main principles of the invention, i.e., that instead of having a strainer surface of large vertical extension which due to great static pressure differences occurring between different parts and causing an uneven separating effect, the strainer surface is enlarged by means of folds which although comparatively shallow, provide a considerably larger strainer surface than one having a flat surface.

The second basic principle according to the invention is achieved by the centrifugal forces acting in the main flow direction of the suspension across the straining bottom, said forces in combination with the special fold design of the bottom preventing particles unable to pass through said bottom to adhere to said bottom.

It is obvious that such a device provides a complete self-cleansing and an even separating effect, being capable of "swallowing" even comparatively large solid particles in the suspension, said device being equally suited for separating coarse as well as fine particles. It should be noted that, for clarity of illustration, the device is shown with a somewhat greater vertical dimension than it need actually have. The device, in practice, may be made to be very compact and space saving.

The disc 15 has a downwardly directed conical shape to maintain an approximately uniform radial flow in the space above the straining bottom. For the same purpose and in order to control the degree of thickening of the suspension so as to obtain a maximum effect liquid such as water may be supplied through an inlet 20 arranged above said disc 15, such liquid entering the chamber 4 through openings 21 in the said disc 15.

The device illustrated and described may be modified within the scope of the invention. Thus, the number of straining grooves may be varied and cross section of said grooves be modified, e.g., the form of the cylindrical walls may be changed into a conical form. The disc 15 may be replaced by arms holding the fingers 16a and 16b. Moreover it is possible to arrange the inlet for the suspension above the straining bottom, said duct 8 then being directed downwards against a centrally positioned impenetrable part of said bottom within the straining surface proper. The stirrer may further be provided with stirring means acting only in the space above said grooves. The chamber 1 need not be closed on the upper side provided pressure is not to be supplied to the apparatus, in which case a cover must be provided for.

What I claim is:

Means for the straining fractionation and concentration of solids suspended in a liquid, said means comprising in combination a substantially horizontal straining bottom provided with a concentric fold formation, said formation forming on its top side a multiplicity of concentric annular straining grooves, the side walls of said grooves in a cross section thereof diverging upwards from the bottom of the grooves, the radially outer side wall of each straining groove extending in a radially outward direction; a suspension inlet to a straining chamber above said straining bottom, said inlet being positioned centrally in relation to said straining grooves; a discharge opening from said chamber, positioned radially outside the straining grooves; and a stirrer or agitator arranged centrally to said grooves and mounted for rotation around a substantially vertical axis and positioned in said chamber, said stirrer having pins or fingers extending into said straining grooves in positions to sweep each side surface of said grooves.

References Cited in the file of this patent
UNITED STATES PATENTS

| | | |
|---|---|---|
| 2,332,188 | Andrews | Oct. 19, 1943 |
| 2,561,013 | Coghill et al. | July 17, 1951 |
| 3,029,951 | Cannon | Apr. 17, 1962 |
| 3,053,391 | Nelson | Sept. 11, 1962 |
| 3,092,578 | Cannon et al. | June 4, 1963 |